UNITED STATES PATENT OFFICE.

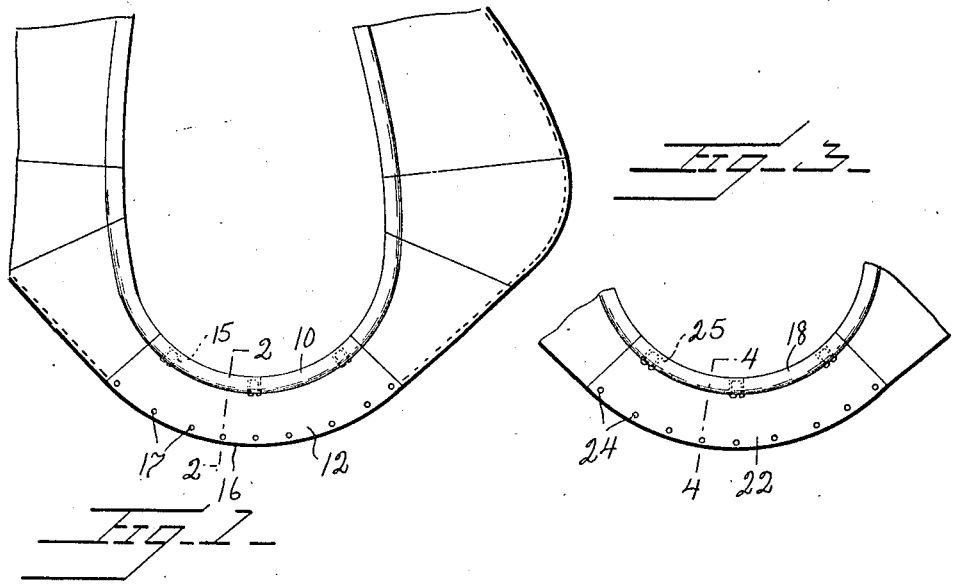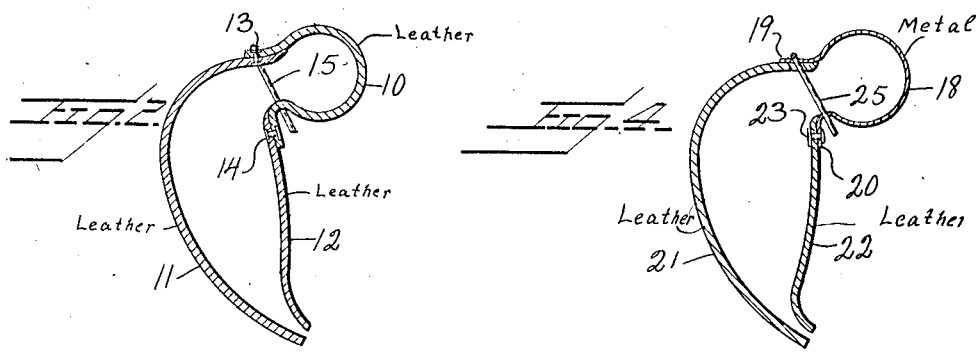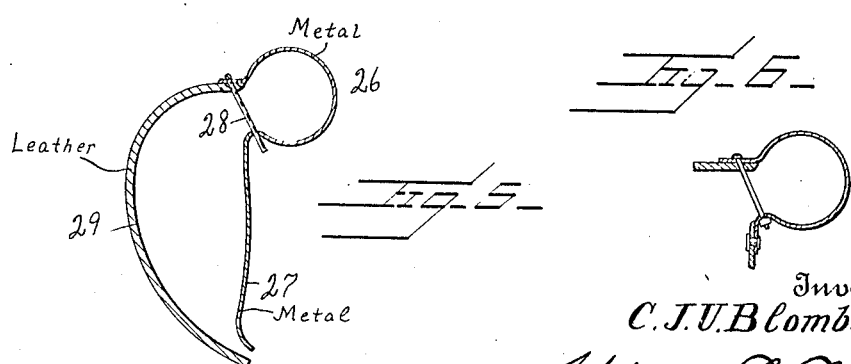

CHARLES J. U. BLOMBERG, OF BRIDGEWATER, SOUTH DAKOTA.

MEANS FOR REPAIRING HORSE-COLLARS.

1,286,213.  Specification of Letters Patent.  Patented Dec. 3, 1918.

Application filed May 29, 1918. Serial No. 237,251.

*To all whom it may concern:*

Be it known that I, CHARLES J. U. BLOMBERG, a citizen of the United States, residing at Bridgewater, in the county of McCook and State of South Dakota, have invented certain new and useful Improvements in Means for Repairing Horse-Collars, of which the following is a specification, reference being had to the accompanying drawings.

This invention relates to horse collars, and particularly to means for repairing horse collars.

The general object of the invention is to provide very simple means whereby horse collars may be readily repaired without the necessity of the labor involved in drawing the leather around the collar and loss of time consequent upon that operation.

A further object is to provide a collar repairing device which may be readily put in place upon a worn collar and attached in place.

A further object is to provide a collar repairing device with a metallic bead or rim to embrace the usual hame bead or rim.

A further object is to provide means whereby the collar repairing device may be attached to the worn collar without the necessity of sewing with lace leather.

Other objects will appear in the course of the following description.

My invention is illustrated in the accompanying drawings, wherein:—

Figure 1 is a face view of a horse collar with my repair device applied thereto;

Fig. 2 is an enlarged section on the line 2—2 of Fig. 1 of the repair device;

Fig. 3 is a fragmentary front elevation showing another form of repair device;

Fig. 4 is a like section to Fig. 2 but through the repair device shown in Fig. 3;

Fig. 5 is a sectional view through another form of repair device; and

Fig. 6 is a fragmentary sectional view showing the use of screws instead of staples.

Where a horse collar is worn, it is usually worn at the lower portion of the collar and it is a very difficult job to repair the horse collar, as the usual way of repairing the collar is by pulling leather around the collar, fitting it thereto and sewing it thereon, this operation taking from one-half to an hour to repair the collar. I obviate this necessity by providing a repair device or article which may be quickly applied to the collar to be repaired.

In Fig. 2, I show a form of repair device which is entirely composed of leather. This repair device is composed of three parts, namely, the bead 10, the inner leather section 11 and the outer leather section 12. The bead 10 is nearly circular in cross section and is riveted at its margin by the rivets 13 to the section 11, this section being rounded so as to fit against the neck and shoulders of the horse. The outer section 12 is relatively flat and is riveted to the margin of the bead section 10 as at 14.

In use this repair device is slipped over the collar to be repaired and is drawn tightly in place so that the bead section 10 fits around the hame shoulder of the collar. Three double pointed rivets 15 are then driven through the margins of the bead section 10, these double pointed rivets 15 being driven from the inside and at a point slightly above the line of the rivets 13, but extending through the crease defined by the rows of rivets 14. Previous to driving the double pointed rivets 14 and after the repairing device has been placed upon the collar and drawn snugly in place, the marginal edges 16 of the sections 11 and 12 are riveted by the rivets 17. Then the double pointed staples 15 are driven as before stated, thus holding the repair device from longitudinal shifting on the collar.

In Fig. 4 I show another form of repair device which I regard as preferable to that shown in Fig. 2, and which consists of a bead section 18 of resilient metal instead of leather, the marginal portion of the bead section being slightly angled as at 19 and acutely angled as at 20 for the attachment of the sections 21 and 22 which are of leather. The margins 19 and 20 are riveted to the sections 21 and 22 by the rivets 23 and after this repair member has been placed upon the collar, the margins of the sections 21 and 22 are riveted together by the rivets 24. Double pointed staples 25 are then driven through the margin 20 of the bead section and through the margin 19 and clenched. The advantage of this resilient steel or iron rim or bead 18 over the leather rim or bead 10 is that the metallic rim or bead has a tendency to stiffen the collar and make it much more durable. With my repair device a worn collar may be made as strong as ever and practically as good as new at a small cost. With the repair device illustrated in Fig. 4 a very badly worn collar may be repaired in three or four minutes whereby with the old method of repairing it would take anywhere from half an hour to an hour to repair the collar. Relatively cheap leather stock may be used for the sections 11 and 12 or 21 and 22, these being softened in warm water until the leather is in proper condition for use, then riveted to the bead or rim section, and slipped over the collar. By using the staples 15 and 25, I obviate the necessity of sewing with lace leather and at the same time I secure a much stronger construction.

In Fig. 5 I show still another form of my collar repairing device having a metallic rim 26 and an integral metallic front section 27 and having a leather back section 29 riveted to the flange of the rim. This is slipped upon the collar in the manner heretofore described and the free margins of the rim 26 and the leather section 29 are riveted to each other and then double pointed staples 28 are driven through the perforations in the flange of the rim and in the crease defining the junction of the rim and front section 27. This is done after the collar repairing device is placed upon the collar as heretofore described. It will be seen that in all of my constructions, I provide a repair device which makes a good collar stiffener and bottom brace for cotton or cloth collars and it will be noted that it is the lower end or bottom of the collar that is the weakest, particularly where the collars are made of cotton or cloth.

While I have referred to the use of staples 15 and 25, I wish it understood that screws might be used in place of these staples (see Fig. 6). It will be obvious, of course, that these repair devices will be made in two or three sizes as to cross section and they may also be made in a number of sizes as to length.

Having thus described my invention, what I claim is:

1. A repair device of the character described comprising a metallic rim section having angularly disposed margins, an outer section, an inner leather section, said sections being riveted to the margins of the rim section, the free margins of the sections being adapted to be riveted to each other, and the metallic rim section adjacent its margin being provided with a plurality of pairs of perforations for the passage of attaching screws or staples.

2. A repair device of the character described comprising a resilient metallic rim section having angularly disposed margins, and an outer metallic section and an inner leather section riveted to the margins of the rim section, the free margins of the leather and metallic sections being adapted to be riveted to each other, and the metallic section adjacent its margin being provided with a plurality of pairs of perforations for the passage of attaching screws or staples.

In testimony whereof I hereunto affix my signature in the presence of two witnesses.

CHARLES J. U. BLOMBERG.

Witnesses:
W. J. SHANARD,
E. N. LUFERMAN.

Copies of this patent may be obtained for five cents each, by addressing the "Commissioner of Patents, Washington, D. C."